United States Patent
Huynh et al.

(10) Patent No.: US 7,307,390 B2
(45) Date of Patent: Dec. 11, 2007

(54) PRIMARY SIDE CONSTANT OUTPUT VOLTAGE CONTROLLER

(75) Inventors: Steven Huynh, Santa Clara, CA (US); Mingliang Chen, Seterrett, AL (US); Chuan Xiao, ShangHai (CN); Mingfan Yu, Shanghai (CN)

(73) Assignee: Active-Semi International, Inc. (KY)

( * ) Notice: Subject to any disclaimer, the term of this patent is extended or adjusted under 35 U.S.C. 154(b) by 0 days.

(21) Appl. No.: 11/326,828

(22) Filed: Jan. 6, 2006

(65) Prior Publication Data

US 2006/0284567 A1    Dec. 21, 2006

Related U.S. Application Data

(60) Provisional application No. 60/691,979, filed on Jun. 16, 2005.

(51) Int. Cl.
*H05B 37/02* (2006.01)
(52) U.S. Cl. ............... 315/291; 315/307; 315/276; 315/209 R
(58) Field of Classification Search ............ 315/224, 315/291, 307; 363/21.01, 21.04, 21.1, 21.12
See application file for complete search history.

(56) References Cited

U.S. PATENT DOCUMENTS

| | | | |
|---|---|---|---|
| 4,301,497 A | 11/1981 | Johari | 363/21.12 |
| 4,849,869 A | 7/1989 | Tanuma et al. | 363/21.13 |
| 5,363,288 A | 11/1994 | Castell et al. | 363/21.12 |
| 5,436,550 A | 7/1995 | Arakawa | 323/222 |
| 5,754,414 A | 5/1998 | Hanington | 363/21.12 |
| 5,841,643 A | 11/1998 | Schenkel | 363/21.13 |
| 6,229,366 B1 | 5/2001 | Balakirshnan | |
| 6,239,558 B1 * | 5/2001 | Fujimura et al. | 315/307 |
| 6,696,882 B1 | 2/2004 | Markowski et al. | 327/531 |
| 6,721,192 B1 | 4/2004 | Yang | |
| 6,864,644 B2 * | 3/2005 | Kernahan | 315/307 |
| 6,944,034 B1 | 9/2005 | Shteynberg et al. | 363/21.13 |
| 6,958,920 B2 * | 10/2005 | Mednik et al. | 363/19 |
| 6,967,472 B2 | 11/2005 | Balakrishnan | |
| 7,019,506 B2 * | 3/2006 | Kernahan | 323/284 |
| 7,061,780 B2 * | 6/2006 | Yang et al. | 363/21.16 |
| 7,088,598 B2 * | 8/2006 | Yang et al. | 363/21.01 |
| 2002/0039298 A1 * | 4/2002 | Riggio et al. | 363/22 |
| 2004/0075600 A1 * | 4/2004 | Vera et al. | 341/166 |
| 2006/0077697 A1 * | 4/2006 | Yang | 363/21.13 |
| 2006/0113973 A1 | 6/2006 | Fukumoto et al. | 323/282 |
| 2006/0133117 A1 * | 6/2006 | genannt Berghegger | 363/19 |
| 2006/0285365 A1 | 12/2006 | Huynh et al. | 363/16 |
| 2007/0133234 A1 * | 6/2007 | Huynh et al. | 363/20 |

OTHER PUBLICATIONS

USPTO Non-final Office Action for U.S. Appl. No. 11/311,656, filed Dec. 17, 2005, inventors Huynh et al. (13 pages).

* cited by examiner

*Primary Examiner*—Trinh Vo Dinh

(57) ABSTRACT

A lower-cost and more precise control methodology of regulating the output voltage of a Flyback converter from the primary side is provided, which works accurately in either continuous voltage mode (CCM) or discontinuous mode (DCM). The methodology can be applied to most small, medium and high power applications such as cell phone chargers, power management in desktop computers and networking equipment, and, generally, to a wide spectrum of power management applications. Two highly integrated semiconductor chips based on this control methodology are also described that require very few components to build a constant voltage Flyback converter.

22 Claims, 11 Drawing Sheets

PRIMARY SIDE CONSTANT OUTPUT VOLTAGE CONTROLLER

CROSS-REFERENCE TO RELATED APPLICATIONS

The present Utility patent application claims priority benefit of the U.S. provisional application for patent having Ser. No. 60/691,979, filed on Jun. 16, 2005 under 35 U.S.C. 119(e), and entitled "Primary Side Constant Output Voltage Controller." The contents of this related provisional application are incorporated herein by reference.

FEDERALLY SPONSORED RESEARCH OR DEVELOPMENT

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

This invention relates generally to the field of power conversion. More particularly, to switching mode power supplies with regulated output voltage.

BACKGROUND OF THE INVENTION

With the aggressive growth of battery powered portable electronics, e.g., cell phones, the demand for lower cost, lighter weight and better efficiency battery chargers is very high. Historically, linear power supplies have been employed. However, despite being low in cost, they cannot generally outperform switching mode power supplies, which have lower weight and much higher efficiency. For many applications, the Flyback converter is often chosen from among different switching mode topologies to meet this demand due to its simplicity and good efficiency.

Over the years, various Pulse Width Modulation (PWM) controller integrated circuit (IC) chips have been developed and used to build constant voltage Flyback power supplies. Known designs require too many additional components to support the PWM controller IC chip, which increases cost and device size.

FIG. 1 illustrates a schematic of an exemplary prior-art primary side controlled constant output voltage Flyback converter circuit. Such a converter typically comprises a transformer 201 (which has three windings), a secondary side resistor 301 (which represents the copper loss of transformer 201), a primary switch 105, a secondary rectifier 302, an output capacitor 303, and a control IC 104. A resistor 101 and a capacitor 102 provide the initial start-up energy for IC 104. Once the Flyback converter is stable, IC 104 is powered by the auxiliary winding (with Na number of turns) of transformer 201 via rectifier 103. The output voltage is fed back to the primary side via the auxiliary winding, rectified and filtered by rectifier 107 and capacitor 110, and sensed by voltage divider resistors 108 and 109. A resistor 106 senses the current flowing through primary switch 105. IC 104 is a peak current mode PWM controller.

The circuit of FIG. 1 works well as long as the requirement of output voltage regulation is not stringent. Typically, 10% load regulation with a loading from 10% to 100% of its rated maximum load can be met. However, this regulation tends to become poor when loading drops below 10% of its rated load both at least because the transformer copper loss varies with output current and input voltage and/or the auxiliary winding of transformer 201 contains an undesired resonant waveform when the Flyback converter operates at discontinuous current mode (DCM).

In an attempt to meet this tight regulation requirement, the secondary side controlled Flyback converter shown in FIG. 2 is often used. Using this configuration, 5% or better load regulation with a loading from 10% to 100% of its rated maximum load can be typically achieved. In the circuit shown, the output voltage is sensed as an error signal by voltage divider resistors 305 and 307, and is monitored by a secondary IC 306. The error signal is then fed back to primary IC 104 via an optical coupler 202. A known disadvantage of this circuit, however, is relatively high cost. For example, IC 306 and safety approved optical coupler 202 add significant cost, which can be up to 10% of the overall material cost in a typical application.

Some known approaches for primary feedback control of constant output voltage switching regulators teach the use of a reflected auxiliary winding voltage or current to control the peak voltage. One known deficiency of such known methods is that the output voltage constant control is applicable only in discontinuous conduction mode (DCM) operation, thereby limiting the power capability of the power converter. For continuous conduction mode (CCM) operation, current industry solutions almost exclusively rely on the use of an optocoupler as shown in FIG. 1. Typically, they will use the auxiliary current/voltage (e.g., via diode and RC filters) to control the peak primary voltage. When auxiliary voltage (i.e., the control voltage) decreases, the primary voltage is reduced. In addition, the output voltage variation versus load change and/or input voltage is often relatively poor. Thus, no tight regulation of input voltage is typically possible.

In view of the foregoing, what is needed is a relatively low-cost and effective control methodology of regulating the primary side output voltage of a Flyback converter. It would be desirable if at least some of the foregoing limitations of the prior art are overcome for both continuous voltage mode (CVM) and discontinuous mode (DCM) operation, preferably with a minimal number of IC chips (e.g., two IC chips). It is further desirable that the need for a secondary circuit and optical coupler are eliminated, and that the output voltage of a Flyback converter be largely insensitive to temperature variations.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
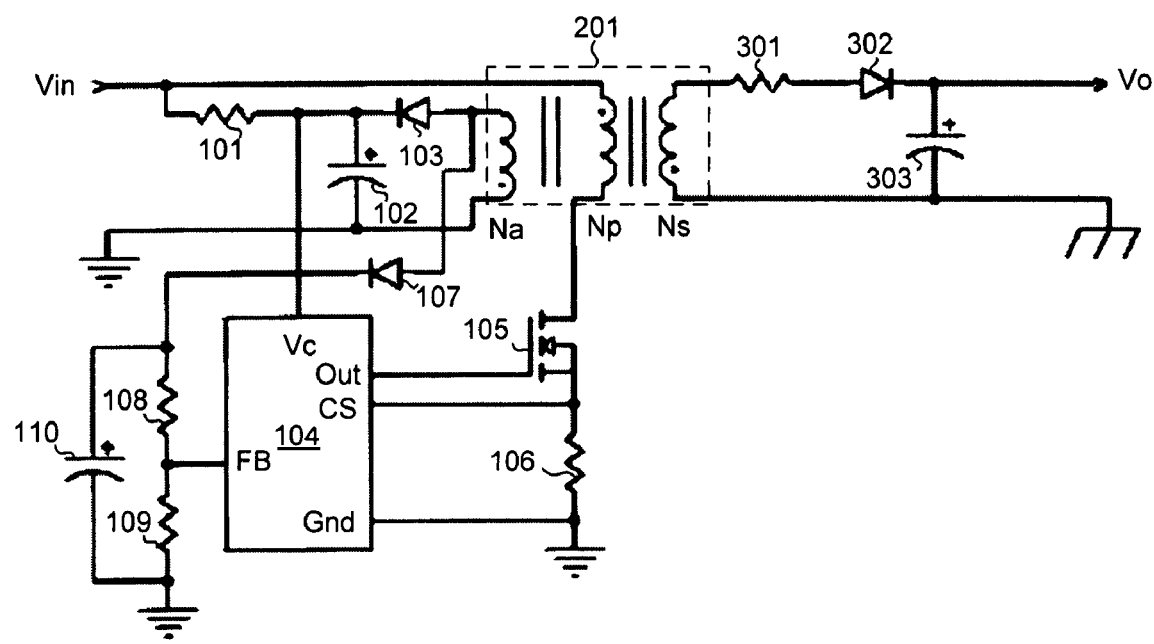
FIG. 1 illustrates a schematic of an exemplary prior-art primary side controlled constant output voltage Flyback converter circuit.
Figure 2:
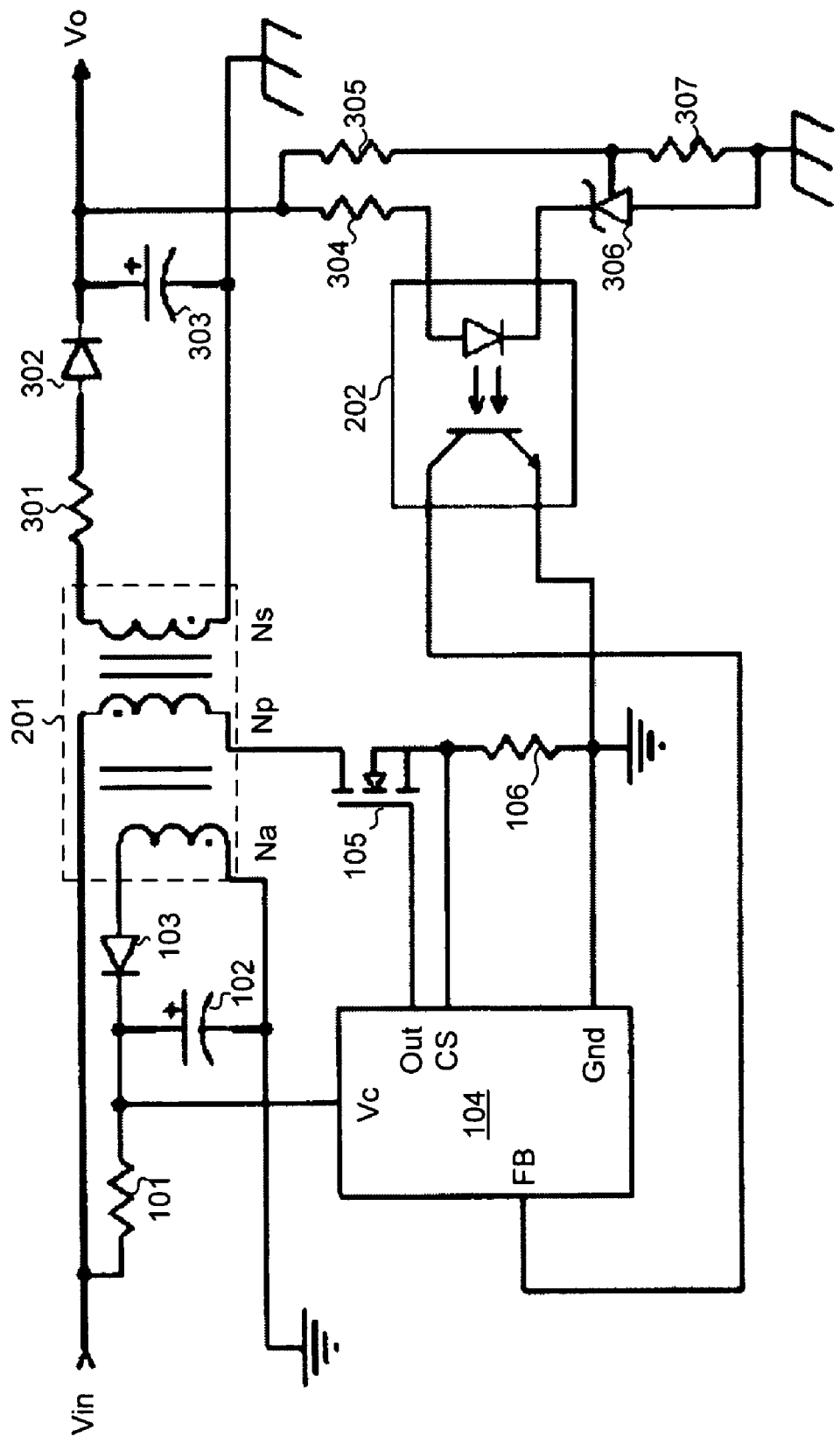
FIG. 2 illustrates a schematic of an exemplary prior-art secondary side controlled constant output voltage Flyback converter circuit.

Unless otherwise indicated, illustrations in the figures are not necessarily drawn to scale.

SUMMARY OF THE INVENTION

To achieve the forgoing and other objects in accordance with the purpose of the invention, a variety of techniques to regulate the output voltage of a switching regulator are described.

Some embodiments of the present invention provide for a primary side, constant output voltage PWM controller system and/or IC for a switching regulator with a transformer having at least a primary, a secondary and an auxiliary winding, and includes a timing generator configured to generate a sample timing signal based on a feedback signal, and is operable for controlling sampling in both a discontinuous current mode and a continuous current mode; two sample-and-hold circuits, one operable for sampling the feedback signal and the other operable for sampling the current of a switched power output device, both being configured with a control input that receives said sample timing signal and thereby controls the sampling; an error amplifier, which outputs an error signal based on the difference between a reference signal and the sampled feedback signal, where the reference signal is used to set the output voltage level of the switching regulator; a comparator that is configured to compare one or more ramp signals such as, without limitation, the error signal and/or a slope compensation signal; a PWM controller module that outputs a PWM switching regulator control signal based on an oscillator output and the comparator output; and a gate drive module that receives the PWM control signal and generates a corresponding gate drive signal operable for properly turning on or off a switched power output device of the switching regulator.

A multiplicity of other embodiments may further provide variations of the prior embodiments in which the reference signal is provided by a programmable current mirror circuit operable to output a programmed current; and/or in which the sample-and-hold circuit for sampling the current of a switched power output device is removed; and/or in which the switched power output device is a power MOSFET that is configured as the main power switch of the switching regulator; and/or the other embodiments further include a current sensing circuit for generating the output current feedback signal that optionally comprises a MOSFET connected in parallel with the switched power output device; and/or in which the comparator is a peak current mode PWM comparator with a slope-compensation input.

Another embodiment of the present invention provides means for achieving the functions described in the foregoing embodiments.

In yet other embodiments of the present invention, a constant output voltage PWM controller printed circuit board (PCB) module is described that includes a PCB and an embodiment of the foregoing integrated circuit device joined onto the PCB, where the PCB can be optionally populated with the necessary electronic components such that, in functional combination with the integrated circuit (IC) device, the PCB module is operable to perform as a constant voltage switching regulator.

A method, according to another embodiment of the present invention, is provided for regulating the output voltage of a Flyback converter from the primary side, and such method includes steps for regulating the output voltage of the Flyback converter to a desired value, and steps for reducing the temperature/copper loss sensitivity of the output voltage.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive.

The present invention will now be described in detail with reference to embodiments thereof as illustrated in the accompanying drawings.

An aspect of the present invention is to provide a relatively low-cost and effective control methodology capable of regulating the output voltage of a Flyback converter from the primary side with reasonably good accuracy from 0% to 100% of its rated load in at least some applications. In this way, the secondary side control circuit and the optical coupler may be eliminated, thereby reducing costs and improving reliability at least due to a lower component count.

As mentioned above, at least two factors can account for errors in the voltage regulation of a primary side controlled Flyback converter circuit. Such factors include: 1) the transformer copper loss varies with output current and input voltage and 2) the voltage sensing of the DCM operation is not accurate. To address the first factor, a current source that provides a current at a level derived from the primary switch current is used to compensate for the variations. To address the second factor, an adaptive sampling and hold circuit is used to capture the feedback voltage when the current of the secondary winding of the transformer discharges to zero. Based on this control methodology, two associated PWM controller IC chip embodiments will be described in some detail below.

Figure 3:
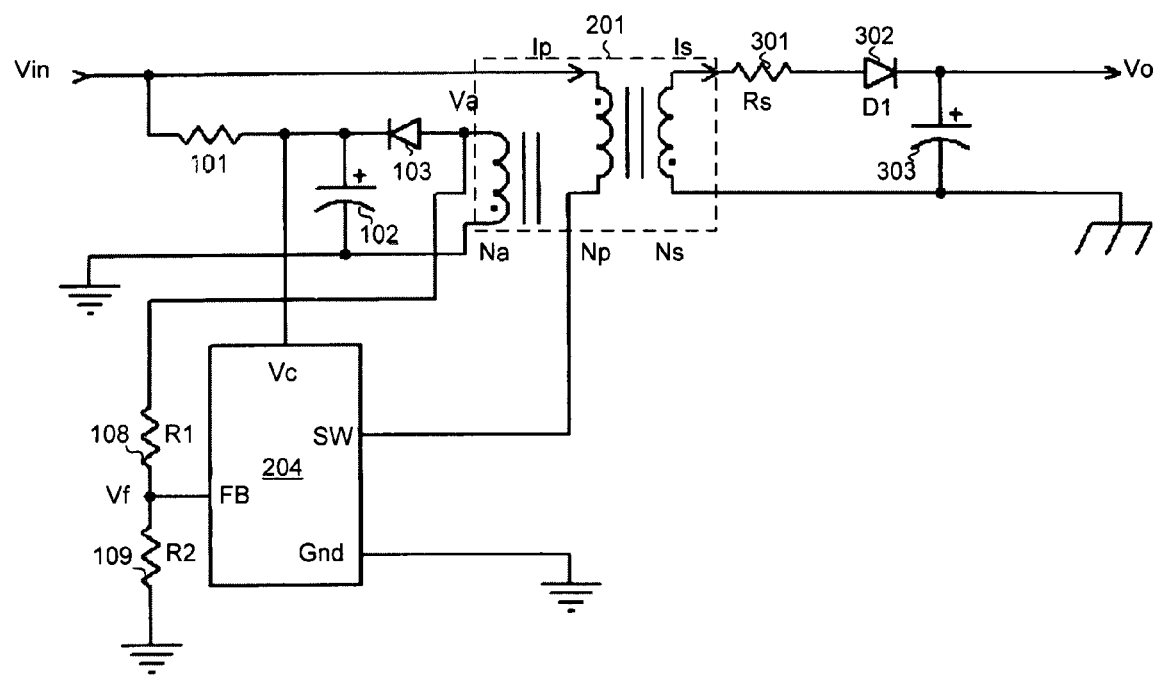
FIG. 3 illustrates, in accordance with an embodiment of the present invention, a schematic of an exemplary primary side controlled constant output voltage Flyback converter circuit implementing a first PWM controller IC chip embodiment of the present invention.

FIG. 3 illustrates, in accordance with an embodiment of the present invention, a schematic of an exemplary primary side controlled constant output voltage Flyback converter circuit implementing a first embodiment of PWM controller IC chip 204 in accordance with an aspect of the present invention. The exemplary circuit shown in the FIG. 3 comprises a transformer 201 (which has three windings: primary with $N_p$ turns, secondary with $N_s$ turns and auxiliary with $N_a$ turns), a secondary side resistor 301 (which represents the copper loss of transformer 201), a secondary rectifier 302, an output capacitor 303, and a peak current mode PWM control in PWM controller IC 204. Resistor 101 and capacitor 102 provide the initial start-up energy for PWM controller IC 204. Once the Flyback converter is stable, PWM controller IC 204 is powered by the auxiliary winding of transformer 201 via rectifier 103. The output voltage is fed back to the FB input pin of PWM controller IC chip 204 via the auxiliary winding and voltage divider resistors 108 and 109. Those skilled in the art, in light of the teachings of the present invention, will readily recognize that the feedback for the FB input pin may come from any other suitable source beyond the auxiliary winding of the transformer; by way of example, and not limitation, from the primary winding. In alternate embodiments of the present invention (not shown), the transformer does not have any auxiliary windings, and only has a primary and secondary winding. Those skilled in the art will recognize a multiplicity of alternate and suitable transformer types and interface circuit configurations to be operable with connection to the FB input pin.

PWM controller IC 204 is optionally capable of self-starting from the input line through a combination of a relatively large time constant charging resistor 101 and an energy storage capacitor 102.

Figure 4:
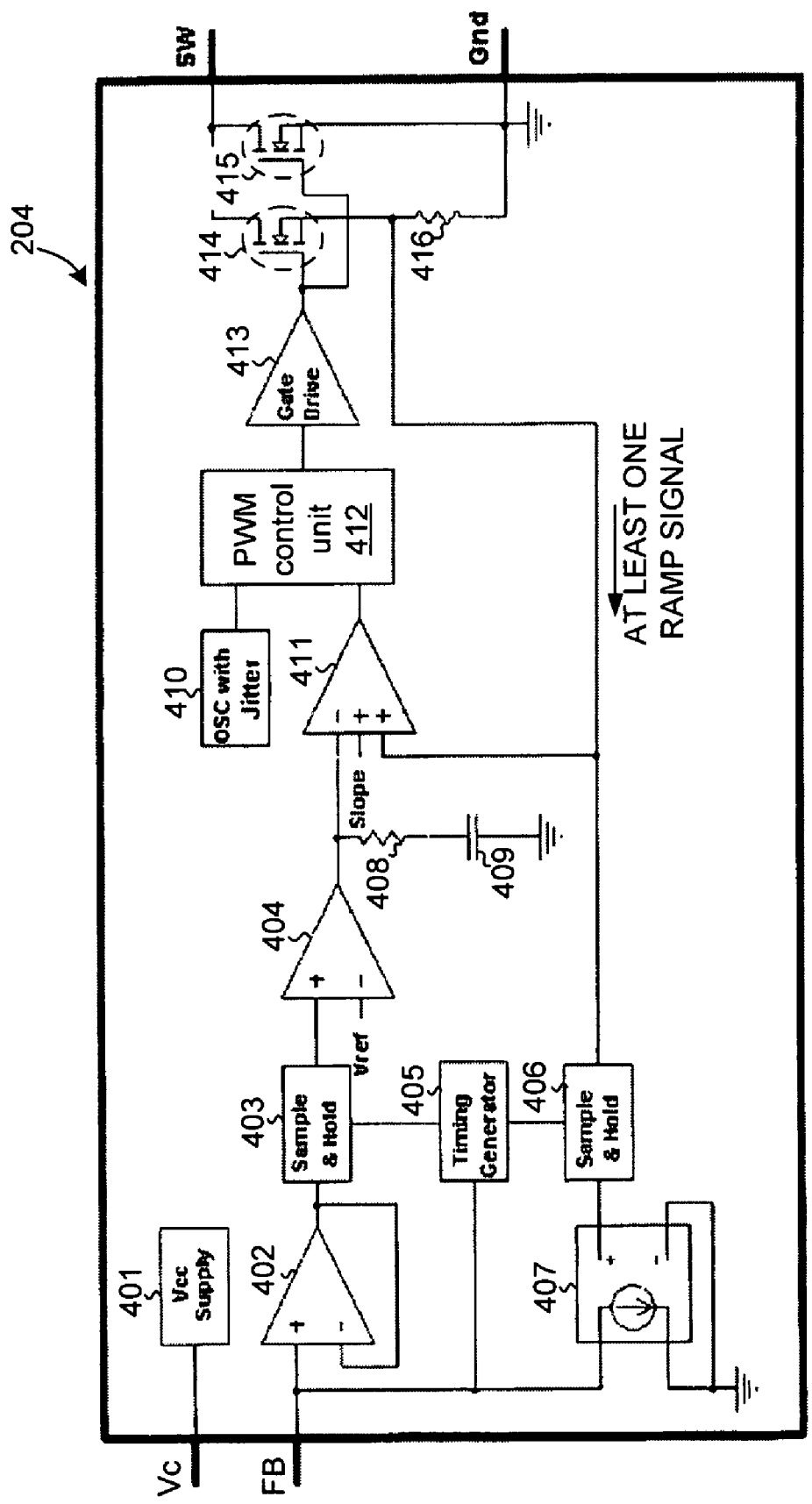
FIG. 4 illustrates an exemplary block diagram of the first PWM controller IC chip embodiment.

FIG. 4 illustrates an exemplary block diagram of a first embodiment of PWM controller IC chip 204. The first embodiment of PWM controller IC comprises an internal power MOSFET as the main switch and a current sense MOSFET. Hence, no external MOSFET or current sense resistor is needed for relatively low power applications. As illustrated in FIG. 4, a Vcc supply 401 provides an internal power supply and reference voltage. The feedback voltage FB is amplified by a buffer 402 and then sampled and held by a sample-and-hold circuit 403. In the preferred embodiment of the present invention, the feedback voltage is sampled and held at the point that $V_{FB}$ has the minimum variation with respect to time. At this point, the output diode 302 generally has a minimum voltage and its temperature effect is typically the smallest. In applications that do not require such buffering, this buffer stage may be removed in alternate embodiments (not shown). An error amplifier 404 then compares the feedback voltage with a reference voltage ($V_{ref}$). A resistor 408 and a capacitor 409 form a compensation network for error amplifier 404. A comparator 411 serves as a peak current mode PWM comparator with a slope compensation input. In other embodiments of the present invention (not shown), the comparator may be configured by those skilled in the art to compare any suitable ramp signals depending upon the needs of the particular application.

A system oscillator 410 provides a frequency jittering function that widens the frequency spectrum and achieves a lower conducting EMI emission. The jittering function is preferably implemented as a digital jitter circuit that is configured to achieve more overall voltage regulation precision and is largely insensitive to temperature variations and other parasitic components. An example of a preferred frequency jittering circuit is described in connection with FIG. 10.

Alternate embodiments of the present invention may not include the frequency jittering function in system oscillator 410 and/or slope compensation. In many applications, slope compensation and the system oscillator jitter function can improve converter operation in certain input/output operating conditions. However, these functions are completely optional, whereby alternate embodiments of the present invention may not include either one or both.

A PWM control unit 412 then generates the correct PWM waveform by utilizing a cycle-by-cycle current limiting function. A MOSFET 413 is a high speed MOSFET gate driver. A power MOSFET 415 serves as the main switch, while a MOSFET 414 and a resistor 416 form a current sense circuit. As will be readily apparent to the system designer, some applications may not require resistor 416 to generate the current sensing voltage feedback or it may be located in other circuit configurations, or embedded into other system components. As will be readily recognized by those skilled in the art, depending upon the needs of the particular application and available technology, the power MOSFET may be formed in any suitable manner; by way of example, and not limitation, the power MOSFET may be comprised of a multiplicity of smaller MOSFET device to form a single power MOSFET.

A timing generator 405 senses the negative going-edge of $V_f$ waveform and produces triggering signals for sample-and-hold circuits 403 and 406.

A voltage controlled current source 407 then programs the current source to output a current having a level of $\beta \cdot I_p$ according to equation (2) described below, and is useful in many applications to make the feedback voltage largely independent of transformer copper loss. This is achieved by inserting a shunt current source (not shown in FIG. 3) at the mid-point of the feedback voltage divider resistors 108 and 109. The shunt current source is preferably programmed to provide a current proportional to the current of the primary switch (shown as current Ip in FIG. 3). The calculation of the resistance of upper resistor 108 of the feedback voltage divider follows equation (5) below. Those skilled in the art will recognize a multiplicity of alternate and suitable means for achieving the same function as voltage controlled current source 407 instead of that shown. Sample-and-hold circuits 403 samples the buffered feedback voltage and sample-and-hold circuits 406 samples the current of the primary switch. In the present embodiment, the primary current $I_p$ flows through MOSFET 414 and power MOSFET 415, and the portion of $I_p$ flowing through MOSFET 414 is inversely proportional to the ON resistance of MOSFET 414 and power MOSFET 415. Resistor 416 produces a voltage that is also proportional to the primary current Ip. Sample-and-hold circuit 406 then senses the voltage across resistor 416, whereby the output voltage of the sample-and-hold circuit 406 controls the output current of voltage controlled current source 407. In this way, the combination of 406 and 407 work to carry out equation (2) below.

It should be appreciated that in contrast to conventional approaches that only work in DCM, the present embodiment implements a method for using "sampled Auxiliary Flyback Voltage" to control the primary current. Sampling the Auxiliary Flyback Voltage at a known time point provides a more accurate representation of the actual output voltage in most applications. The present embodiment is largely independent of auxiliary voltage and/or current variations by, for example, basing output current control based only on primary current sensing and the ratio of T_R/T_ON, which works in both DCM and CCM. Hence, embodiments of the present invention preferably do not use auxiliary voltage to control primary current by essentially scaling the peak current (IPEAK) as proportional to square root of the output voltage, as is done in conventional approaches.

Figure 5:
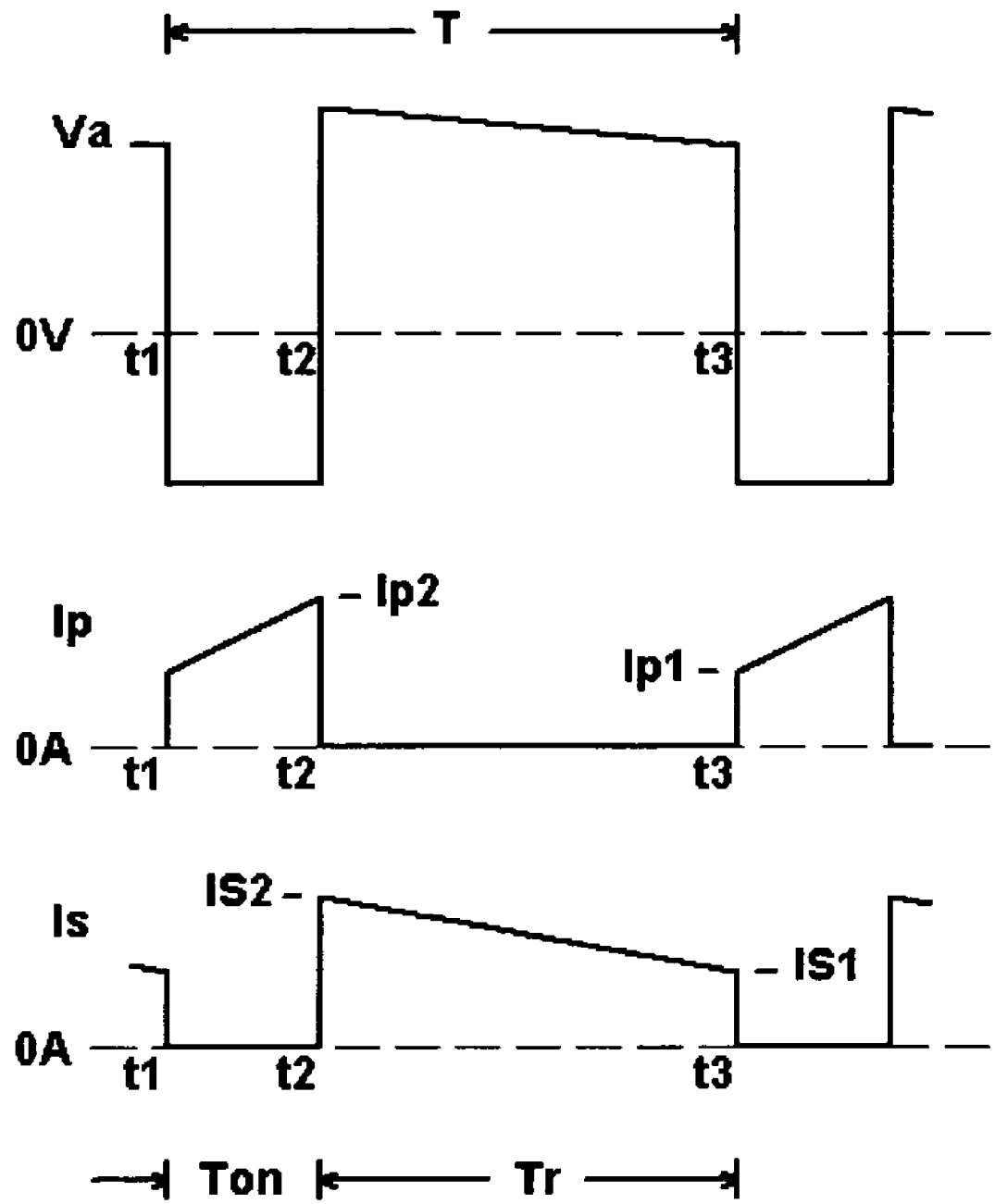
FIG. 5 illustrates exemplary ideal waveforms of the auxiliary winding voltage, primary switch current and secondary rectifier current of the Flyback converter of FIG. 3 operating in continuous current mode (CCM)

FIG. 5 illustrates exemplary ideal waveforms of the auxiliary winding voltage, primary switch current and secondary rectifier current of the Flyback converter of FIG. 3 operating in continuous current mode (CCM). With reference to both FIGS. 4 and 5, main switch 415 turns on at $t_1$, turns off at $t_2$ and turns on again at $t_3$. The switching period is T, the turn-on time is $T_{on}$ and the turn-off time is $T_r$. The voltage at the auxiliary winding ($V_a$) at the time just before $t_3$ can be expressed as, $$V_a = (N_a/N_S) \cdot (V_0 + V_{D1} + I_S \cdot R_S) \quad (1)$$

We may then assume that shunt current $I_{407}$ of current source 407, as shown in FIG. 4, is programmed by, $$I_{407} = \beta \cdot I_P. \quad (2)$$

Because $$I_P = (N_S/N_P) \cdot I_S, \quad (3)$$

the output voltage sense $V_f$ can be expressed by, $$V_f = (R_2/(R_1+R_2)) \cdot (N_a/N_S) \cdot (V_0+V_{D1}+I_S \cdot R_S) - ((R_1 \cdot R_2)/(R_1+R_2)) \cdot \beta \cdot I_S \cdot (N_S/N_P), \quad (4)$$

where resistors 108 and 109 are referenced as R1 and R2, respectively.

If $R_1$ is chosen as, $$R_1 = (N_P \cdot N_a \cdot R_S)/(\beta \cdot N_S \cdot N_S) \quad (5)$$

then, $$V_f = (R_2/(R_1+R_2)) \cdot (N_a/N_S) \cdot (V_0+V_{D1}). \quad (6)$$

Therefore, if the shunt current $I_{407}$ of voltage controlled current source 407 is programmed per equation (2) and the value of $R_1$ is chosen by equation (5), then output voltage sense $V_f$ is practically independent of the copper loss ($I_S \cdot R_S$) of transformer 201. It should also be noted that, for CCM operation, $V_f$ is preferably sampled and held at the time just before $t_3$, as it is more optimal to sense the feedback voltage at the time just before the primary winding turns on for CCM and at the time when the current of the secondary winding of the transformer discharges to zero.

Figure 6:
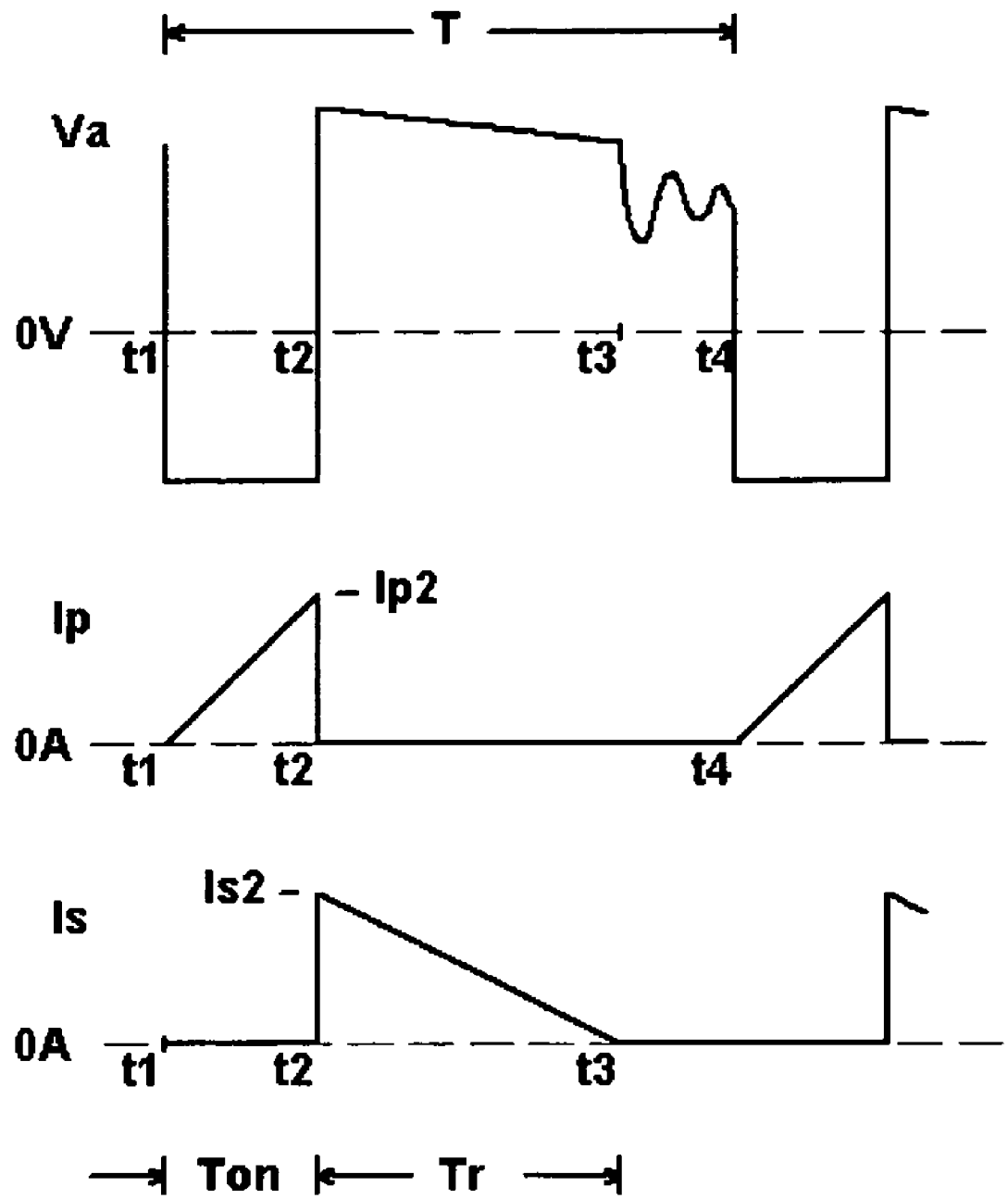
FIG. 6 illustrates exemplary ideal waveforms of the auxiliary winding voltage, primary switch current and secondary rectifier current of the Flyback converter of FIG. 3 operating in discontinuous current mode (DCM)

FIG. 6 illustrates exemplary ideal waveforms of the auxiliary winding voltage, primary switch current and secondary rectifier current of the Flyback converter of FIG. 3 operating in discontinuous current mode (DCM). With reference to both FIGS. 4 and 5, main switch 415 turns on at $t_1$, turns off at $t_2$ and turns on again at $t_4$. The switching period is T, the turn-on time is $T_{on}$ and the turn-off time is equal to $(t_4-t_2)$. $T_r$ is equal to $(t_3-t_2)$. As shown in FIG. 6, the current at the secondary winding of transformer 201 discharges to zero at $t_3$. The voltage $V_a$ at the auxiliary winding between times $t_3$ and $t_4$ oscillates at a frequency determined by the parasitic inductance and capacitance of the circuit. In this case, $V_f$ is preferably sampled and held at the time just before $t_3$ to achieve a more accurate feedback voltage.

Figure 7:
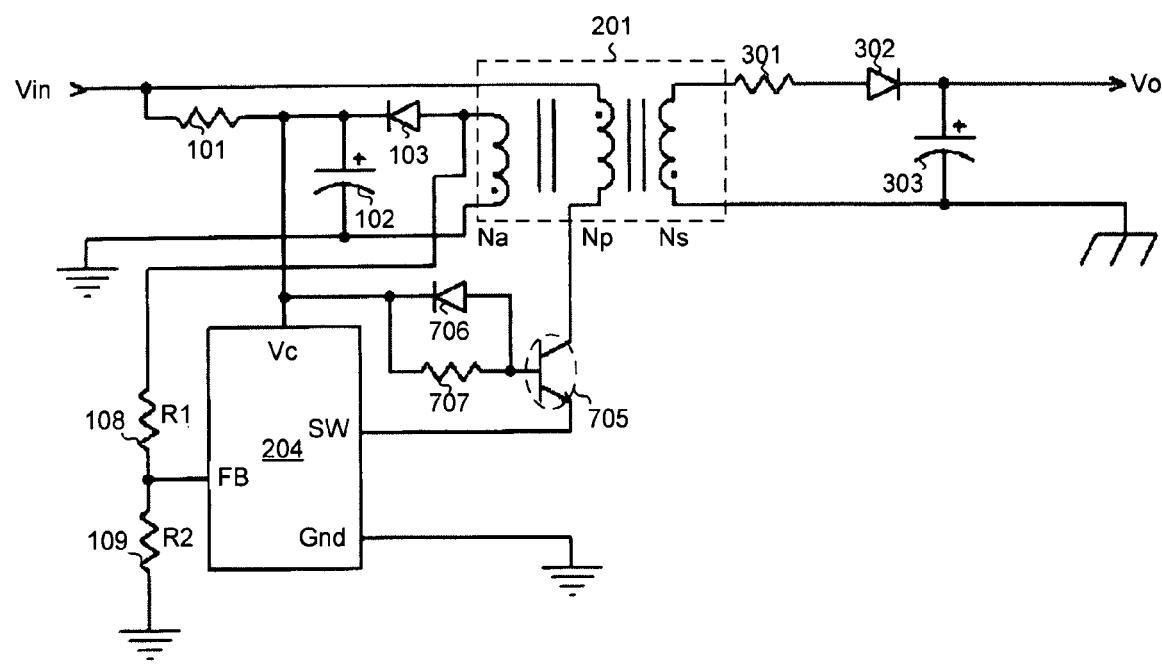
FIG. 7 illustrates an exemplary schematic of a primary side controlled constant output voltage Flyback converter circuit implementing the first PWM controller IC chip embodiment in an emitter switching configuration according to an embodiment of the present invention.

FIG. 7 illustrates an exemplary schematic of a primary side controlled constant output voltage Flyback converter circuit implementing the first embodiment of PWM controller IC chip 204 in an emitter switching configuration according to an embodiment of the present invention. As mentioned before, for low power applications, no external power MOSFET or current sense circuit is needed. Shown in FIG. 7, the first embodiment of PWM controller IC chip is configured to drive an NPN bipolar transistor in an emitter switching configuration to boost output power for higher power applications. In such a configuration, with reference to both FIGS. 4 and 7, internal MOSFET 415 drives the emitter of external NPN transistor 705, which serves as the main switch. To achieve further power handling capability and/or switching frequency, an external MOSFET must typically be used as the main switch as shown in FIG. 9.

Figure 8:
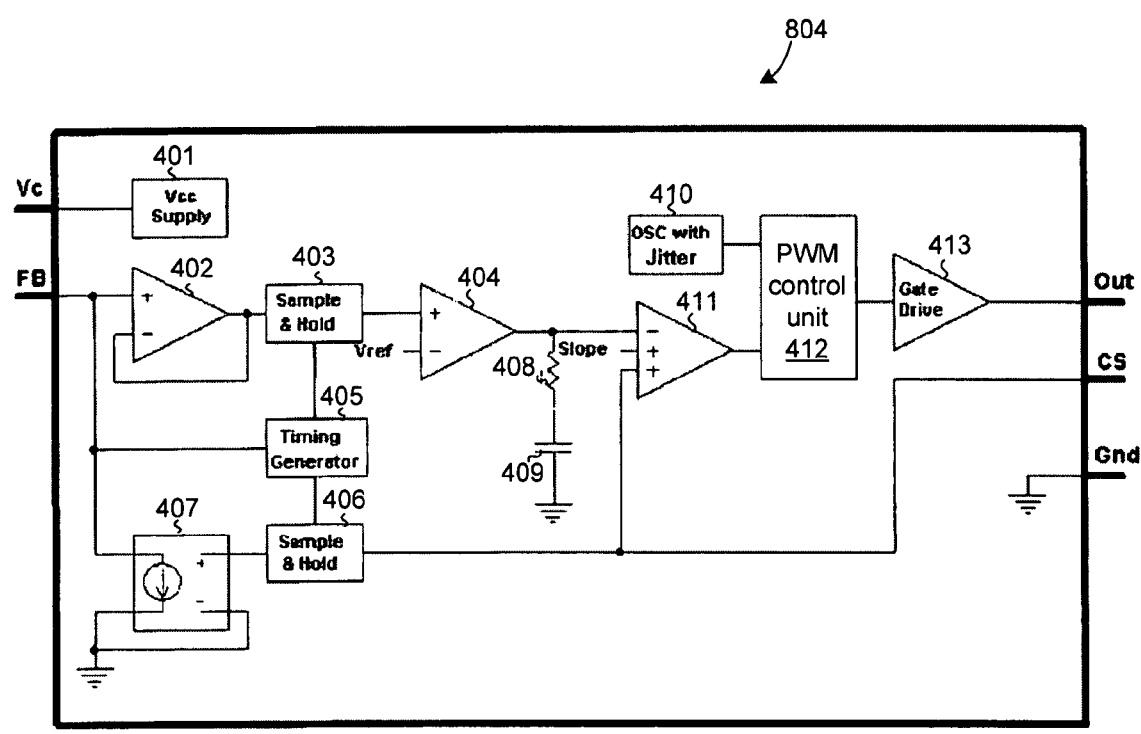
FIG. 8 illustrates an exemplary block diagram of a second PWM controller IC chip embodiment of the present invention.

FIG. 8 illustrates an exemplary block diagram of a PWM controller IC chip 804, in accordance with a second embodiment of the present invention. PWM controller IC chip 804 does not include internal power MOSFET 415, current sensing MOSFET 414 and current sensing resistor 416 from the first PWM controller IC chip embodiment of FIG. 4. In this second embodiment, the current driving capability of gate drive 413 results in improved control for larger MOSFETs. In this second embodiment, gate drive 413 is designed with appropriate current driving capability suitable for controlling larger MOSFETs.

Figure 9:
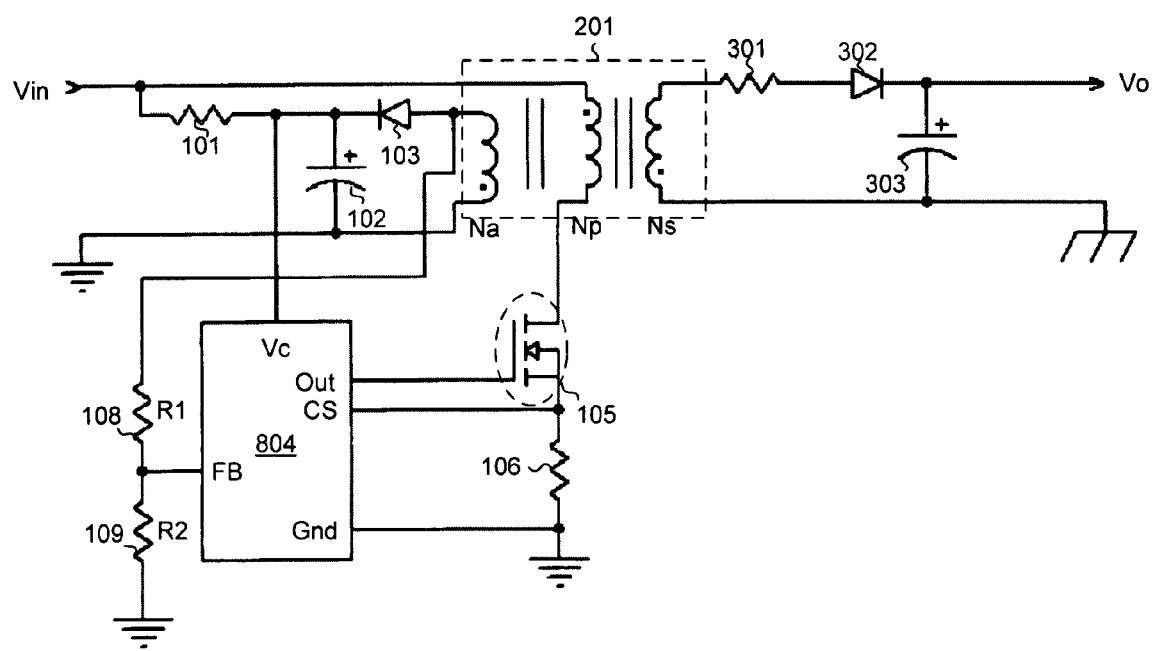
FIG. 9 illustrates an exemplary schematic of a primary side controlled constant output voltage Flyback converter circuit implementing the second PWM controller IC chip embodiment with an external MOSFET and current sensing resistor, in accordance with an embodiment of the present invention.

FIG. 9 illustrates an exemplary schematic of a primary side controlled constant output voltage Flyback converter circuit implementing PWM controller chip 804 with an external MOSFET and current sensing resistor, in accordance with an embodiment of the present invention.

Figure 10:
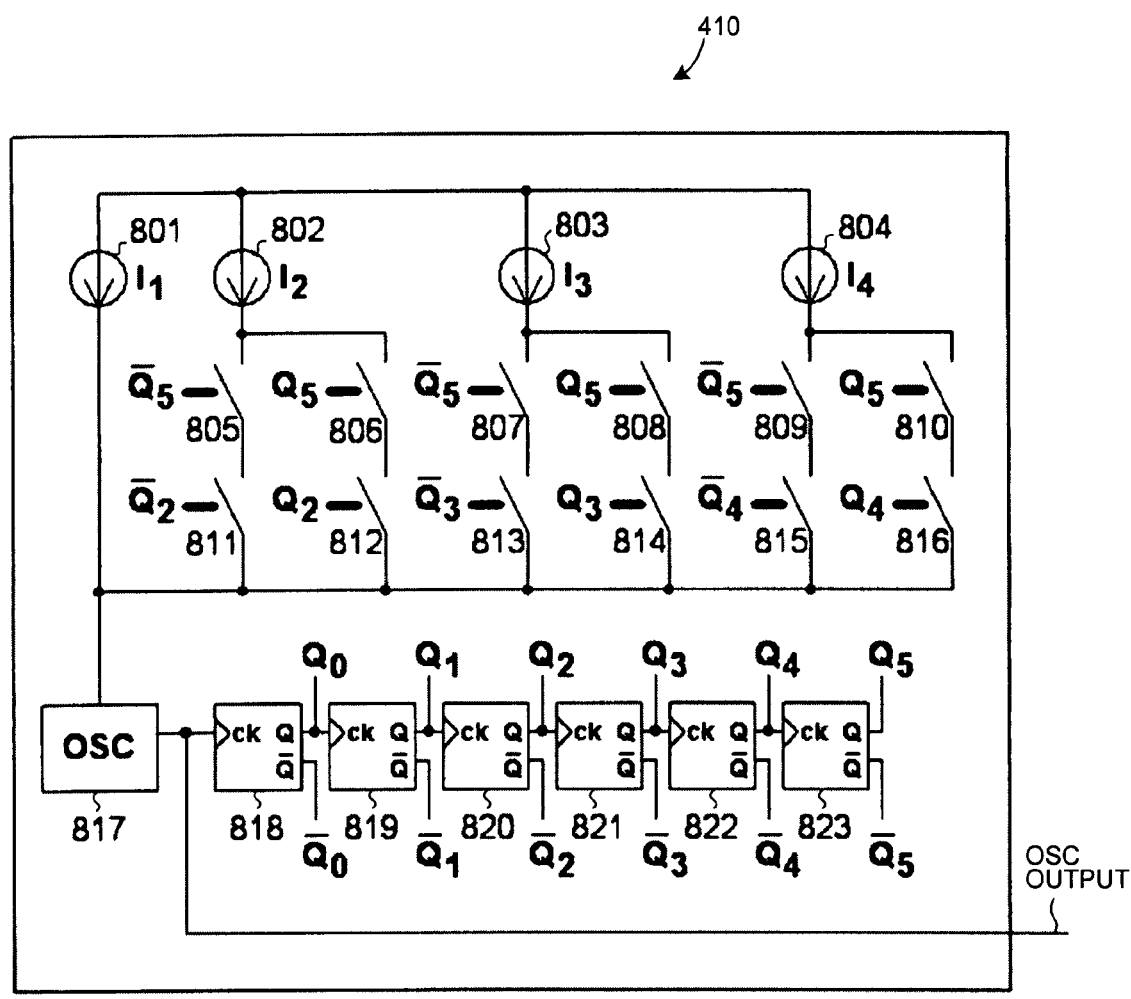
FIG. 10 illustrates a schematic diagram of an exemplary digital frequency jittering circuit that is suitable to implement the foregoing jitter functional block, in accordance with an embodiment of the present invention.

The functional blocks shown in the prior embodiments may be implemented in accordance known with techniques as will be readily apparent to those skilled in the art. However, some embodiments of the present invention include implementation approaches that are not conventional. For example, without limitation, the foregoing jitter functional block may be implemented as follows. FIG. 10 illustrates a schematic diagram of an exemplary system oscillator 410 having a digital frequency jittering circuit that is suitable to implement the foregoing jitter functional block, in accordance with an embodiment of the present invention. The frequency jittering in the present embodiment is implemented by a digital control scheme, which departs from known approaches. An oscillator 817 is preferably a current controlled oscillator. There is preferably an uncontrolled, base-line, current source 801, which, in one aspect, is present to set a minimum oscillator frequency, Fmin, that the switched current sources will jitter from. In the embodiment shown, the current to oscillator 817 is controlled by a multiplicity of switched current sources 802-804 that carry out the jittering of the oscillator's minimum frequency. The frequency of the system oscillator output signal is generally proportional to the total current entering into oscillator 817. In alternate embodiments, any number of current sources may be implemented depending upon the needs of the particular application. The jitter behavior is generated by feeding back a pseudo random digital signal to a multiplicity of series connected flip-flops (e.g., 818 to 823). Current sources 801, 802, 803 and 804 are presently preferred to be currents of magnitudes 100 µA, 2.5 µA, 5 µA and 10 µA, respectively. Each switched current source is presently configured with four current control switches (e.g., control switches 805, 806, 811 and 812 for switched current source 802) that are arranged in two parallel legs with each leg having two switches in series. In this way, for current to flow into oscillator 817 at least one leg must have both of its switches turned on. In similar fashion, four switches (807, 808, 813 and 814) are connected to switched current source 803 and another four switches (809, 810, 815 and 816) are connected to switched current source 804. All of these switches are closed or open by a control input from an output from the series connected flip-flop chain. In the example shown, the switch 805 is open when $Q_5$ is at logic level "1" and is closed when $Q_5$ is at logic level "0". Similarly, the switch 806 is open when $Q_5$ is at logic level "0" and is closed when $Q_5$ is at logic level "1", and so on. When all the switched current sources are enabled, a maximum frequency, Fmax, of the system oscillator output signal is achieved. As will be readily apparent to those skilled in the art, in light of the present teachings, the choice of which flip-flop outputs connect to which current control switch will determine a certain jittering pattern. An aspect of this digital frequency jittering scheme is that the period and the step of frequency variation may be relatively precisely controlled, and is largely insensitive to temperature variations. It should be appreciated that in contrast to conventional analog techniques for jittering the oscillator frequency, the digital jittering approach of the present embodiment always provide digitally calculated frequency step irrespective of the known shortcomings that analog based techniques suffer from; such as, without limitation, temperature, input, output age dependences, etc. Those skilled in the art, in light of the present teachings, will readily recognize a multiplicity of alternate and suitable implementations that implement the spirit of the present embodiment. By way of example, and not limitation, current based operation may be replaced with a voltage based approach, and the number and topology of the switches and/or current sources and/or flip-flop chain may be altered as needed for the particular application, and other suitable means to selectively control the pattern of current flowing into the current controlled oscillator.

Figure 11:
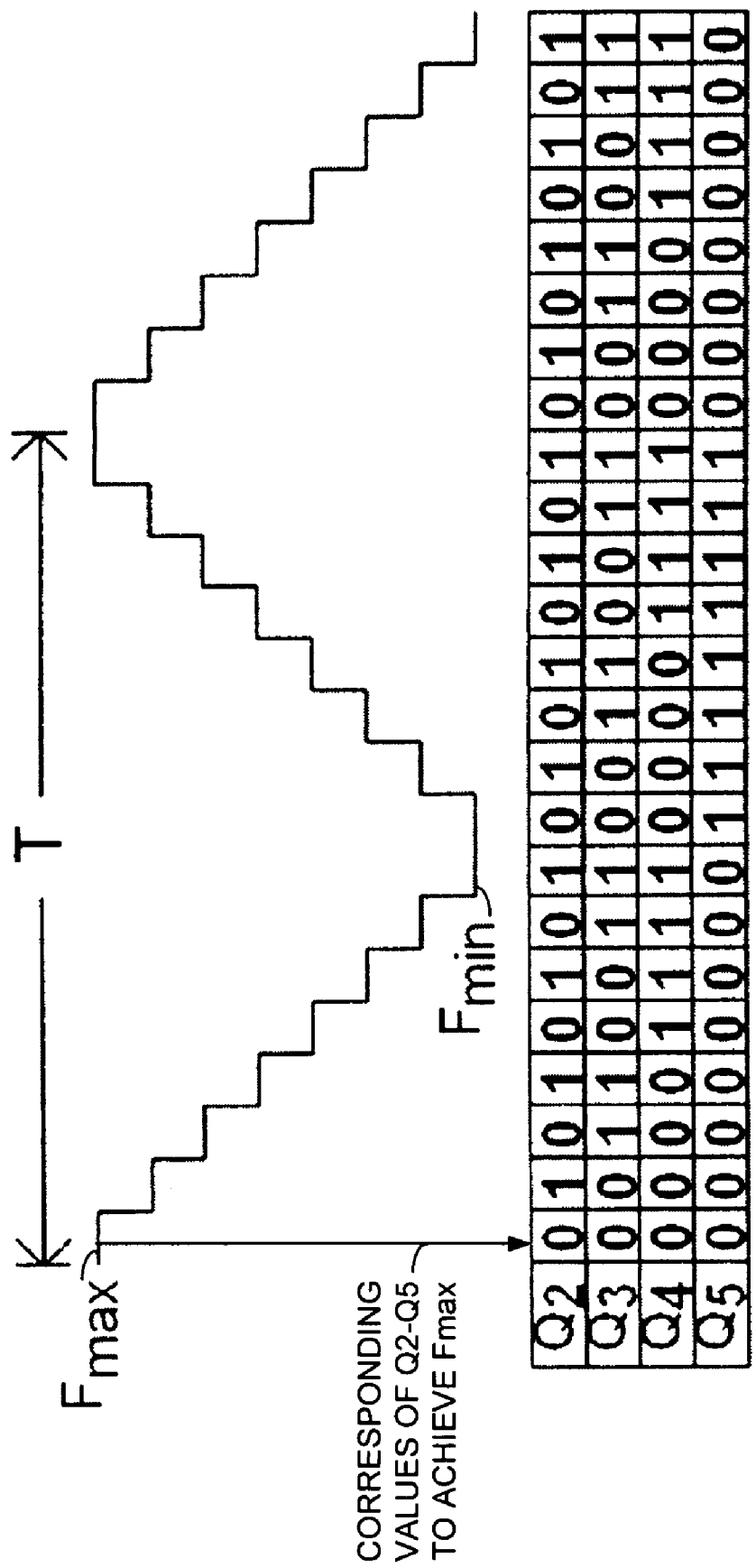
FIG. 11 illustrates an exemplary jitter frequency control logic diagram for the exemplary digital frequency jittering circuit of FIG. 10, in accordance with an embodiment of the present invention.

FIG. 11 illustrates an exemplary jitter frequency control logic diagram for the exemplary digital frequency jittering circuit of FIG. 10, in accordance with an embodiment of the present invention. In the example shown, frequency variation from its maximum (Fmax) to minimum (Fmin) corresponding to the logic states "0" or "1" of $Q_2$, $Q_3$, $Q_4$ and $Q_5$.

Having fully described at least one embodiment of the present invention, other equivalent or alternative techniques for a primary side constant output voltage controller according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

The invention claimed is:

1. A primary side, constant output voltage Pulse Width Modulation (PWM) controller system for a switching regulator with a transformer having at least a primary winding and a secondary winding, the system comprising:
   a timing generator configured to generate a sample timing signal based on a feedback signal, the sample timing signal being operable for controlling sampling in either a discontinuous current mode or a continuous current mode of operation;
   a first sample-and-hold circuit operable for sampling the feedback signal, the first sample-and-hold circuit being configured with a control input that receives the sample timing signal and wherein the control input is operable for controlling the sampling;
   an error amplifier that receives a reference signal and the feedback signal and that outputs a signal based on the difference there between, wherein the reference signal sets the output voltage level of the switching regulator;
   a comparator that is configured to output a comparison between the error amplifier output and at least one ramp signal;
   an oscillator;
   a PWM controller module that outputs a PWM switching regulator control signal based on an oscillator output and the comparator output; and
   a gate drive module that receives the PWM switching regulator control signal and generates a corresponding gate drive signal operable for turning on or off a switched power output device of the switching regulator.

2. The constant voltage PWM controller system of claim 1, further comprising a second sample-and-hold circuit operable for sampling a current of the switched power output device, the second sample-and-hold circuit being configured with a control input that receives the sample timing signal and is operable for controlling the sampling.

3. The constant voltage PWM controller system of claim 1, further comprising means for reducing the temperature and/or copper loss dependence of the output voltage level.

4. The constant voltage PWM controller system of claim 1, wherein the switched power output device is a power MOSFET that is configured as a main power switch of the switching regulator.

5. The constant voltage PWM controller system of claim 1, further comprising a current sensing circuit for generating at least one of the at least one ramp signals.

6. The constant voltage PWM controller system of claim 5, wherein the current sensing circuit comprises a MOSFET connected in parallel with the switched power output device.

7. The constant voltage PWM controller system of claim 1, wherein the comparator comprises a peak current mode PWM comparator with a slope-compensation input.

8. The constant voltage PWM controller system of claim 1, wherein the feedback signal is not derived from a signal associated with the secondary winding of the transformer.

9. The constant voltage PWM controller system of claim 1, wherein the feedback signal is only derived from a signal associated with an auxiliary winding of the transformer.

10. The constant voltage PWM controller system of claim 1, wherein the switched power output device is configured to form a portion of a Flyback converter and wherein the switched power output device is selected from a group consisting of a power MOSFET device or an NPN bipolar transistor in an emitter switching configuration.

11. A primary side, constant output voltage PWM controller integrated circuit (IC) device for a switching regulator with a transformer having at least a primary winding and a secondary winding, the IC device comprising:

a timing generator configured to generate a sample timing signal based on a feedback signal, the sample timing signal being operable for controlling sampling in either a discontinuous current mode or a continuous current mode of operation;

a first sample-and-hold circuit operable for sampling the feedback signal, the first sample-and-hold circuit being configured with a control input that receives the sample timing signal and is operable for controlling the sampling;

a second sample-and-hold circuit operable for sampling a current of a switched power output device of the switching regulator, the second sample-and-hold circuit being configured with a control input that receives the sample timing signal and is operable for controlling the sampling of the second sample-and-hold circuit;

an error amplifier, which receives a reference signal and the feedback signal, and outputs a signal based on the difference there between, wherein the reference signal sets the output voltage level of the switching regulator;

a comparator that is configured to output a comparison between the error amplifier output and at least one ramp signal;

an oscillator;

a PWM controller module that outputs a PWM switching regulator control signal based on an output from the oscillator and the comparator output;

a gate drive module that receives the PWM switching regulator control signal and generates a corresponding gate drive signal operable for properly turning on or off the switched power output device of the switching regulator; and an IC package configured to operably contain the functional components of the IC device and provide inputs and output contacts required for the functional components to be properly connected to a circuit external to the IC device.

12. The constant voltage PWM controller IC device of claim 11, further comprising means for reducing the temperature and/or copper loss dependence of the output voltage level.

13. The constant voltage PWM controller IC device of claim 11, wherein the switched power output device is a power MOSFET that is configured as a main power switch of the switching regulator.

14. The constant voltage PWM controller IC device of claim 11, further comprising a current sensing circuit for generating at least one of the at least one ramp signals.

15. The constant voltage PWM controller IC device of claim 14, wherein the current sensing circuit comprises a MOSFET connected in parallel with the switched power output device.

16. The constant voltage PWM controller IC device of claim 11, wherein the comparator is a peak current mode PWM comparator with a slope-compensation input.

17. The constant voltage PWM controller IC device of claim 11, wherein the feedback signal is not derived from a signal associated with the secondary winding of the transformer.

18. The constant voltage PWM controller IC device of claim 11, wherein the feedback signal is only derived from a signal associated with an auxiliary winding of the transformer.

19. The constant voltage PWM controller IC device of claim 11, wherein the switched power output device is configured to form a portion of a Flyback converter and wherein the switched power output device is selected from a group consisting of a power MOSFET device or an NPN bipolar transistor in an emitter switching configuration.

20. The constant voltage PWM controller IC device of claim 11, further comprising:

a printed circuit board (PCB), wherein the IC device is joined onto the PCB, the PCB being optionally populated with the necessary electronic components such that, in functional combination with the IC device, the PCB module is operable to perform as a constant voltage switching regulator.

21. A primary side, constant output voltage PWM controller system for a switching regulator with a transformer having at least a primary winding and a secondary winding, the system comprising:

means for generating a sample timing signal based on a feedback signal;

means for sampling the feedback signal based on the sample timing signal;

means for sampling a current of a switched power output device based on the sample timing signal;

means for generating an error signal based on a reference signal and the feedback signal, wherein the reference signal sets the output voltage level of the switching regulator;

means for outputting a comparison of the error signal and at least one ramp signal;

an oscillator;

means for generating a PWM switching regulator control signal based on an output from the oscillator and the comparison; and means for generating a gate drive signal based on the PWM switching regulator control signal that is operable to turn on or off a switched power output device of the switching regulator.

22. The constant voltage PWM controller system of claim 21, further comprising means for reducing the temperature and/or copper loss dependence of the output voltage level.

* * * * *